(12) United States Patent
Tong et al.

(10) Patent No.: US 10,051,489 B2
(45) Date of Patent: Aug. 14, 2018

(54) METHOD OF CSI REPORTING, USER EQUIPMENT AND ENODE B

(75) Inventors: Hui Tong, Beijing (CN); Masayuki Hoshino, Kanagawa (JP); Akihiko Nishio, Osaka (JP); Ming Xu, Beijing (CN); Daichi Imamura, Beijing (CN)

(73) Assignee: Sun Patent Trust, New York, NY (US)

(*) Notice: Subject to any disclaimer, the term of this patent is extended or adjusted under 35 U.S.C. 154(b) by 112 days.

(21) Appl. No.: 14/129,259

(22) PCT Filed: May 11, 2012

(86) PCT No.: PCT/CN2012/075340
§ 371 (c)(1),
(2), (4) Date: Dec. 24, 2013

(87) PCT Pub. No.: WO2013/166699
PCT Pub. Date: Nov. 14, 2013

(65) Prior Publication Data
US 2014/0126383 A1    May 8, 2014

(51) Int. Cl.
*H04B 7/06* (2006.01)
*H04W 24/02* (2009.01)
(Continued)

(52) U.S. Cl.
CPC .......... *H04W 24/02* (2013.01); *H04B 7/063* (2013.01); *H04B 7/065* (2013.01); *H04B 7/066* (2013.01);
(Continued)

(58) Field of Classification Search
None
See application file for complete search history.

(56) References Cited

U.S. PATENT DOCUMENTS 8,885,754 B2    11/2014    Kim et al.
8,982,721 B2    3/2015     Su et al.
(Continued)

FOREIGN PATENT DOCUMENTS

CN    101986588 A    3/2011
CN    102013956 A    4/2011
(Continued)

OTHER PUBLICATIONS

International Search Report dated Feb. 7, 2013, for corresponding International Application No. PCT/CN2012/075340, 2 pages.
(Continued)

*Primary Examiner* — Michael J Moore, Jr.
*Assistant Examiner* — Ayanah George
(74) *Attorney, Agent, or Firm* — Seed IP Law Group LLP (57) ABSTRACT

Provided is reporting one or more long term CSI components to an eNode B, wherein at least one long term CSI component being reported with multiple values; and reporting a transmission scheme assumption indicator (TSAI) together with a set of short term CSI components to the eNode B, wherein the TSAI indicating the eNode B of a value of the multiple values of the at least one long term CSI component to be currently used and of the set of short term CSI components being conditioned on the value indicated by the TSAI, wherein the short term CSI components being reported more frequently.

20 Claims, 8 Drawing Sheets

(51) Int. Cl.
  *H04L 1/00* (2006.01)
  *H04W 24/10* (2009.01)
  *H04W 88/02* (2009.01)

(52) U.S. Cl.
  CPC ......... *H04B 7/0632* (2013.01); *H04B 7/0639* (2013.01); *H04L 1/003* (2013.01); *H04L 1/0026* (2013.01); *H04L 1/0027* (2013.01); *H04L 1/0031* (2013.01); *H04W 24/10* (2013.01); *H04W 88/02* (2013.01)

(56) References Cited

U.S. PATENT DOCUMENTS

| | | | | |
|---|---|---|---|---|
| 2008/0219370 | A1* | 9/2008 | Onggosanusi | H04B 7/0417 375/260 |
| 2011/0273993 | A1* | 11/2011 | Mazzarese | H04L 1/0026 370/241 |
| 2012/0051257 | A1 | 3/2012 | Kim et al. | |
| 2012/0063500 | A1* | 3/2012 | Wang | H04L 1/0026 375/224 |
| 2012/0076024 | A1 | 3/2012 | Ko et al. | |
| 2012/0076028 | A1 | 3/2012 | Ko et al. | |
| 2012/0113816 | A1* | 5/2012 | Bhattad | H04L 5/0032 370/246 |
| 2012/0147933 | A1* | 6/2012 | Li | H04B 7/065 375/219 |
| 2012/0219042 | A1* | 8/2012 | Onggosanusi | H04B 7/0456 375/219 |
| 2012/0257568 | A1* | 10/2012 | Cai | H04L 1/1614 370/328 |
| 2012/0320783 | A1 | 12/2012 | Wu et al. | |
| 2013/0003788 | A1* | 1/2013 | Marinier | H04B 7/024 375/219 |
| 2013/0044624 | A1 | 2/2013 | Su et al. | |
| 2013/0064276 | A1* | 3/2013 | Kim | H04B 7/063 375/219 |
| 2013/0129014 | A1 | 5/2013 | Kim et al. | |

FOREIGN PATENT DOCUMENTS

| | | |
|---|---|---|
| CN | 102237969 A | 11/2011 |
| CN | 102291217 A | 12/2011 |
| EP | 2 624 473 A2 | 8/2013 |
| KR | 10-2012-0033283 A | 4/2013 |
| WO | 2011/137752 A1 | 11/2011 |
| WO | 2012/015252 A2 | 2/2012 |
| WO | 2012045143 A1 | 4/2012 |

OTHER PUBLICATIONS

Catt, "PMI/RI/CQI reporting for LTE-A," R1-102056, 3GPP TSG RAN WG1 Meeting #60bis, Agenda Item: 6.3.4.2, Beijing, China, Apr. 12-16, 2010, 4 pages.

Extended European Search Report dated Sep. 23, 2015, for corresponding EP Application No. 12876146.7-1851 / 2710758, 10 pages.

Chinese Search Report with English Translation dated Dec. 31, 2015, for corresponding CN Application No. 201280031347.1, 4 pages.

* cited by examiner

METHOD OF CSI REPORTING, USER EQUIPMENT AND ENODE B

TECHNICAL FIELD

The present disclosure relates to the field of Channel State Information (CSI) reporting in wireless communications.

BACKGROUND

Figure 1A:
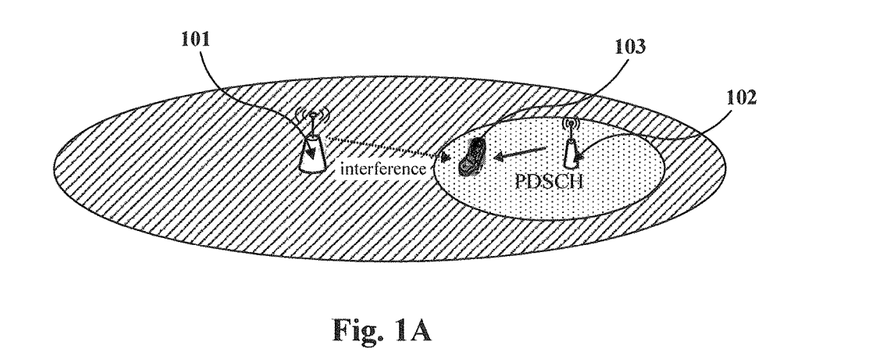
FIG. 1A and FIG. 1B schematically show two assumptions for CQI calculation in a heterogeneous deployment.
Figure 1B:
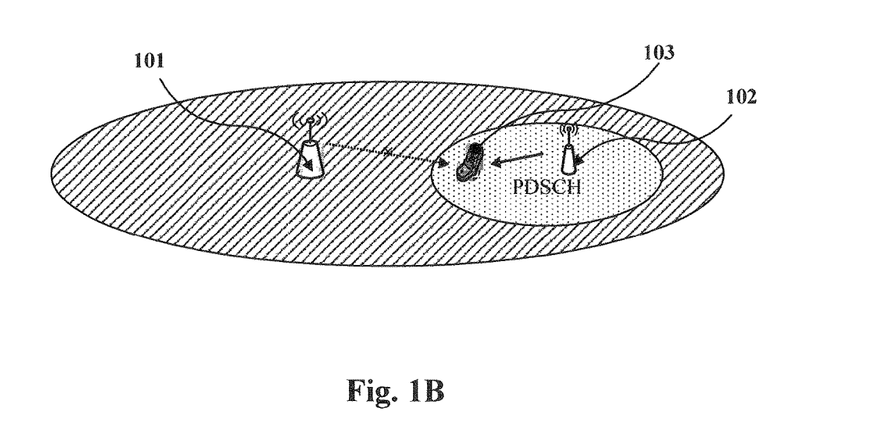
Figure 2:
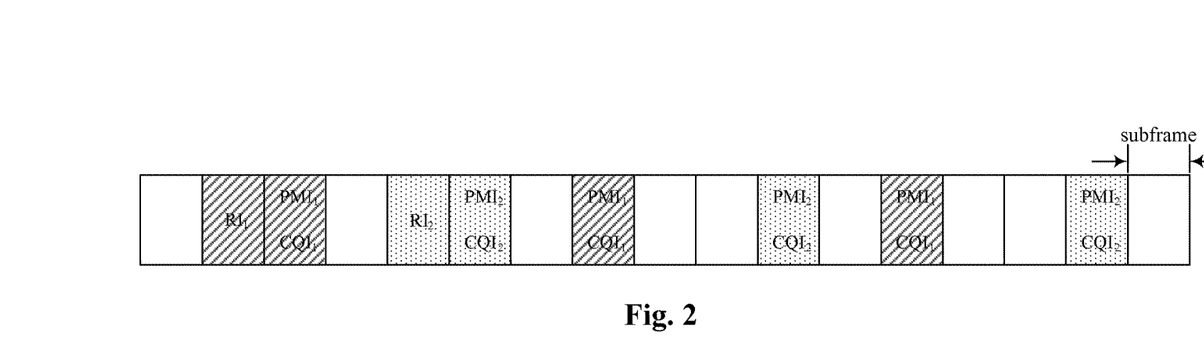
FIG. 2 schematically shows a conventional multiple CSI reporting.

Reporting multiple sets of CSI, including Precoding Matrix Indicator (PMI), Channel Quality Indicator (CQI), and Rank Indicator (RI) as well as Precoding Type Indicator (PTI) and Point Indicator (PI), could enable higher scheduling flexibility at eNode B (eNB) and hence improve cellular system performance, referring to 3GPP (3$^{rd}$ Generation Partnership Project) TS 36.213 V10.5.0, which is incorporated hereto by reference. For example, FIG. 1A and FIG. 1B schematically show two assumptions for CQI calculation in a heterogeneous deployment. In FIG. 1A and FIG. 1B, a user equipment (UE) 103 is located in a cell covered by a eNode B (eNB) 102 and receives Physical Downlink Shared Channel (PDSCH) from the eNB 102. The cell covered by the eNB 102 is overlapped with a macro cell covered by another eNB 101. When the UE 103 reports CSI to the eNB 102, two sets of CQI can be selected. One set of CQI is calculated by assuming the macro cell is not muted, that is, there is interference from the eNB 101 indicated by the dashed arrow, as shown in FIG. 1A, and another set of CQI is calculated by assuming the macro cell is muted as shown in FIG. 1B. Conventionally, a semi-static configuration of multiple CSI reporting is used as shown in FIG. 2. FIG. 2 schematically shows a conventional multiple CSI reporting, in which each block represents one subframe. In the conventional multiple CSI reporting, two sets of CSI are both reported periodically, one of which is $PMI_1$, $CQI_1$ and $RI_1$ and is for example calculated by assuming the macro cell is not muted as shown in FIG. 1A, and the other of which is $PMI_2$, $CQI_2$ and $RI_2$ and is for example calculated by assuming the macro cell is muted as shown in FIG. 1B. $RI_1$ and $RI_2$, which will be referred to as long term CSI components in the context herein, can be reported less frequently, and $PMI_1$, $CQI_1$, $PMI_2$, and $CQI_2$ will be referred to as short term CSI components in the context herein. For example, $RI_1$ and $RI_2$ are reported every 200 subframes, while $PMI_1/CQI_1$ and $PMI_2/CQI_2$ are respectively reported every 5 subframes as shown in FIG. 2. Since both sets of the short term CSI components are reported frequently and periodically, the reporting of multiple sets of CSI increases overhead in uplink due to the consumption of much more subframes taken by the frequently reported short term CSI components.

In order to reduce overhead but still report different sets of CSI, which are for example calculated based on different assumptions in the heterogeneous deployment as shown in FIG. 1A and FIG. 1B, one possibility is to allow a UE to dynamically select a set of CSI from multiple possible sets of CSI to be reported. For example, if a UE is in Cell Range Extension (CRE) region, the UE may switch between the two CQIs. When the UE is allowed to select a set of CSI to be reported, the UE also needs to report an additional Transmission Scheme Assumption Indicator (TSAI) to inform the eNB of which set of CSI is selected by the UE, for example, in the illustrated heterogeneous deployment shown in FIG. 1A and FIG. 1B, to inform eNB which assumption is used by the UE to calculate the values of the CSI being reported. In addition, considering that the interference condition may change dynamically in cellular system, the preferred downlink (DL) transmission scheme at the eNB may also change dynamically. Therefore, it is preferred to report TSAI dynamically, which implies that TSAI should be reported together with PMI/CQI, for example, in the same frames, as shown in FIG. 3.

Figures 3, 4, 5:
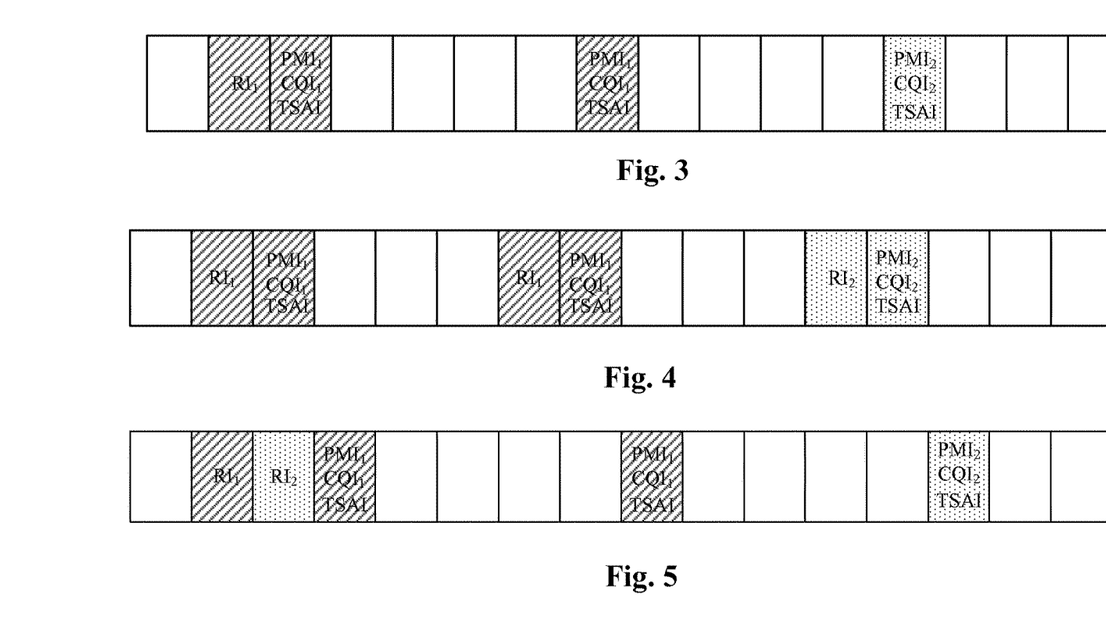
FIG. 3 schematically shows the CSI reporting with TSAI and with only a single RI being reported.
FIG. 4 schematically shows the RI reporting with the same periodicity with TSAI.
FIG. 5 schematically shows the multiple long term CSI reporting according to the first embodiment.

FIG. 3 schematically shows the CSI reporting with TSAI and with only a single RI being reported. In FIG. 3, the long term CSI component RI is reported for example every 200 subframes, and then the short term CSI components PMI/CQI and TSAI, which are encoded in the same subframe, are reported for example every 5 subframes. Different from FIG. 2, in which both sets of PMI/CQI are reported every 5 subframes respectively, in other words, there exist two series of periodical reporting in FIG. 2, in FIG. 3, only one series of PMI/CQI is reported, the UE determines which set of PMI/CQI will be reported each time, and a TSAI is reported together with the PMI/CQI to indicate which set of PMI/CQI is selected at that point. As exemplarily shown in FIG. 3, a first set of PMI/CQI together with a first TSAI ($PMI_1/CQI_1/$ TSAI with hatched background) is chosen to be reported directly after the reporting of RI (which is $RI_1$ in this example), and after four subframes, the first set of PMI/CQI and the first TSAI are still chosen to be reported, and then after another four subframes, a second set of PMI/CQI together with a second TSAI ($PMI_2/CQI_2/$TSAI with dotted background) is chosen to be reported. However, the choosing of which set of PMI/CQI being reported each time is not limited to the above described. The UE can choose any one of multiple possible sets of short term CSI components to report each time according to interference conditions, and the TSAI is used to inform the eNB which set is selected.

In FIG. 3, only one single RI ($RI_1$ in this example) is reported since the same RI is enforced for different sets of PMI/CQI. However, it is noted that for different TSAI, the optimal value of RI can be different. Therefore, if the same RI is enforced for different sets of PMI/CQI, optimal values of RI can not be reported, and such restriction may cause severe performance degradation in some scenarios. In order to solve this problem, a straightforward solution is to report RI dynamically, i.e., with the same frequency as PMI/CQI, but in a different subframe, as shown in FIG. 4. FIG. 4 schematically shows the RI reporting with the same periodicity with TSAI. Different from the measure of FIG. 3, the long term CSI component RI is reported each time the short term CSI components PMI/CQI are reported in FIG. 4. In this case, the optimal values of RI can be reported; however, such solution would cause much overhead and occupy many uplink subframes due to that RI is reported as frequently as short term CSI components, and also increase collision probability.

SUMMARY OF THE DISCLOSURE

The present disclosure is made in view of the above. In order to enable optimal long term CSI component selection while maintaining marginal overhead increase compared with single CSI reporting, multiple long term CSI reporting can be performed, and the value of long term CSI components can be selected based on the value of TSAI.

In one aspect of the present disclosure, there is provided a wireless communication method of reporting channel state information (CSI), comprising steps of: reporting one or more long term CSI components to an eNode B, wherein at least one long term CSI component being reported with multiple values; and reporting a transmission scheme assumption indicator (TSAI) together with a set of short term CSI components to the eNode B, wherein the TSAI indicates the eNode B of a value of the multiple values of the at least one long term CSI component to be currently used and of the set of short term CSI components being conditioned on the value indicated by the TSAI, wherein the short term CSI components are reported more frequently.

In another aspect of the present disclosure, there is provided a user equipment (UE) of reporting channel state information (CSI), comprising a long term CSI reporting unit configured to report one or more long term CSI components to an eNode B, wherein at least one long term CSI component being reported with multiple values; and a short term CSI reporting unit configured to report a transmission scheme assumption indicator (TSAI) together with a set of short term CSI components to the eNode B, wherein the TSAI indicates the eNode B of a value of the multiple values of the at least one long term CSI component to be currently used and of the set of short term CSI components being conditioned on the value indicated by the TSAI, wherein the short term CSI components are reported more frequently.

In a further aspect of the present disclosure, there is provided a wireless communication method of receiving channel state information (CSI), comprising steps of: reporting a set of CSI components including a rank indicator (RI), a precoding matrix indicator (PMI), and a channel quality indicator (CQI), together with a transmission scheme assumption indicator (TSAI) to an eNode B, wherein the TSAI indicates the eNode B of the PMI and the CQI being conditioned on the RI and the TSAI, and the set of CSI components and the TSAI are jointly encoded and reported within one subframe.

In a further aspect of the present disclosure, there is provided an eNode B of receiving channel state information (CSI), comprising: a long term CSI receiving unit configured to receive subframes containing one or more long term CSI components from a user equipment (UE), wherein at least one long term CSI component having multiple values; and a short term CSI receiving unit configured to receive subframes containing a set of short term CSI components and a transmission scheme assumption indicator (TSAI) from the UE, wherein the TSAI indicates a value of the multiple values of the at least one long term CSI component to be currently used and the set of short term CSI components being conditioned on the value indicated by the TSAI.

In a further aspect of the present disclosure, there is provided a wireless communication method of reporting channel state information (CSI), comprising steps of: reporting a set of CSI components including a rank indicator (RI), a precoding matrix indicator (PMI), and a channel quality indicator (CQI), together with a transmission scheme assumption indicator (TSAI) to an eNode B, wherein the TSAI indicates the eNode B of the PMI and the CQI being conditioned on the RI and the TSAI, and the set of CSI components and the TSAI are jointly encoded and reported within one subframe.

In a further aspect of the present disclosure, there is provided a user equipment (UE) of reporting channel state information (CSI), comprising: a reporting unit configured to report a set of CSI components including a rank indicator (RI), a precoding matrix indicator (PMI), and a channel quality indicator (CQI), together with a transmission scheme assumption indicator (TSAI) to an eNode B, wherein the TSAI indicates the eNode B of the PMI and the CQI being conditioned on the RI and the TSAI, and the set of CSI components and the TSAI being jointly encoded and reported within one subframe.

In a further aspect of the present disclosure, there is provided a wireless communication method of receiving channel state information (CSI), comprising steps of: receiving subframes containing a set of CSI components and a transmission scheme assumption indicator (TSAI) from a user equipment (UE), wherein the set of CSI components include a rank indicator (RI), a precoding matrix indicator (PMI), and a channel quality indicator (CQI), the TSAI indicates the PMI and the CQI being conditioned on the RI and the TSAI, and the set of CSI components and the TSAI are jointly encoded and reported within one subframe.

In a further aspect of the present disclosure, there is provided an eNode B of receiving channel state information (CSI), comprising: a receiving unit configured to receive subframes containing a set of CSI components and a transmission scheme assumption indicator (TSAI) from a user equipment (UE), wherein the set of CSI components include a rank indicator (RI), a precoding matrix indicator (PMI), and a channel quality indicator (CQI), the TSAI indicates the PMI and the CQI being conditioned on the RI and the TSAI, and the set of CSI components and the TSAI being jointly encoded and reported within one subframe.

By the above configuration, the optimal long term CSI component selection is enabled while maintaining marginal overhead increase compared with single CSI reporting.

The foregoing is a summary and thus contains, by necessity, simplifications, generalization, and omissions of details; consequently, those skilled in the art will appreciate that the summary is illustrative only and is not intended to be in any way limiting. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

In order to solve the drawbacks of the solutions described above with respect to FIGS. 2-4, it is found based on further analysis that although TSAI needs to be reported dynamically and RI changes with respect to TSAI, given a TSAI, RI still changes slowly. Therefore, it is not necessary to report RI at the same periodicity with TSAI. Instead, it is possible to report multiple RIs (i.e. multiple values of RI) less frequently than TSAI which is reported together with short term CSI components such as PMI and CQI, and the TSAI not only indicates DL transmission scheme assumption (for example, assuming the macro cell is muted or not muted as shown in FIG. 1A and FIG. 1B), i.e. indicates which set of short term CSI components is selected from multiple possible sets of short term components, but also selects the reported RIs, i.e. determines which RI is associated with the currently reported set of short term components. In other words, the TSAI indicates the eNode B of a value of the multiple values of the at least one long term CSI component (RI in this example) to be currently used and of the set of short term CSI components being conditioned on the value indicated by the TSAI. In this way, not only optimal RI can be reported, but also the overhead increase can be marginal.

It is noted that in this context the meaning of "short term" and "long term" is relative, and "long term" CSI components can be reported less frequently, and "short term" CSI components can be reported more frequently. The above analysis is conducted by assuming that the short term CSI components are PMI and CQI and the long term CSI component is RI, however, the scope and concept of the present disclosure are not limited to this assumption. Long term CSI components could be any CSI component which can be reported less frequently, and any other CSI components other than the long term CSI components can be referred to as short term CSI components.

(First Embodiment)

FIG. 5 schematically shows the multiple long term CSI reporting according to the first embodiment. The first embodiment is to report multiple RIs assuming different transmission schemes. In this example, the long term CSI component refers to RI, and the short term CSI components refer to PMI and CQI. As exemplarily shown in FIG. 5, two values ($RI_1$ and $RI_2$) of RI are first reported with each one in one subframe, and then respective sets of PMI and CQI and TSAI are reported every five subframes. Although not illustrated in FIG. 5, it is obvious for those skilled in the art that RIs can be reported again after lots of subframes. RI can be reported periodically for example every 200 subframes. PMI/CQI/TSAI can also be reported periodically for example every 5 subframes as shown in FIG. 5. In the example of FIG. 5, RI is reported with two values ($RI_1$ and $RI_2$) in one period. Here, each set of the PMI, CQI, and TSAI can be encoded into one subframe. At each time of reporting the short term CSI components (PMI/CQI), it would be up to the UE to decide which set of PMI/CQI among multiple possible sets of PMI/CQI ($PMI_1/CQI_1$ or $PMI_2/CQI_2$ in this example) will be reported. The multiple possible sets of PMI/CQI can be calculated for example based on different transmission scheme assumptions respectively, as described above with respective to FIG. 1A and FIG. 1B. In FIG. 5, the UE selects the first set of PMI/CQI ($PMI_1/CQ_1$) to report right after the reporting of RI, then selects the first set again to report after four subframes, and subsequently selects the second set of PMI/CQI ($PMI_2/CQ_2$) to report. It is noted that the above selection is only an example, and the UE can make any selection as desired. In addition, the UE would report the TSAI together with the PMI/CQI in one subframe to indicate the assumption, i.e. to inform the eNB which set of PMI/CQI is selected at each time of reporting. Furthermore, the TSAI would indicate the eNB which RI out of $RI_1$ and $RI_2$ is associated with current PMI/CQI reporting. In other words, the TSAI indicates the eN B of a value of the multiple values of the at least one long term CSI component (RI in this example) to be currently used and of the set of short term CSI components being conditioned on the value indicated by the TSAI. For example, when TSAI is equal to 0, it indicates that the first set of $PMI_1/CQI_1$ is selected and $RI_1$ is associated with the currently reported set of $PMI_1/CQI_1$, i.e. $RI_1$ is currently used and the first set of $PMI_1/CQI_1$ is conditioned on the $RI_1$ which is indicated by the TSAI, and when TSAI is equal to 1, it indicates that the second set of $PMI_2/CQI_2$ is selected and $RI_2$ is associated with the currently reported set of $PMI_2/CQI_2$, i.e. $RI_2$ is currently used and the second set of $PMI_2/CQI_2$ is conditioned on the $RI_2$ which is indicated by the TSAI. Therefore, when the eNB has received and decoded TSAI, it knows which assumption (e.g. the assumption that macro is not muted or the assumption that macro is muted in the example of heterogeneous deployment as shown in FIG. 1A and FIG. 1B) is used for the currently reported PMI/CQI, in other words, it knows which set of short term CSI components is selected from the multiple possible sets of short term CSI components, and the eNB also knows which RI should be selected to be associated with the currently reported PMI/CQI, in other words, it knows which value out of the reported multiple values of the long term CSI component is associated with the currently reported set of short term CSI components. As a result, the eNB obtains the CSI information reported by the UE. By the configuration of the first embodiment, optimal long term CSI component (RI in this example) selection is enabled while maintaining marginal overhead increase since the RI is reported less frequently than the short term CSI components. However, it is noted that although the number of RIs reported is two in this embodiment, it is not limited to that, rather the number can be any as required. In addition, it is understood by those skilled in the art that the reporting times of the short term CSI components in one period of the reporting of long term CSI component can be much larger than 3 as shown in FIG. 5.

Figure 6:
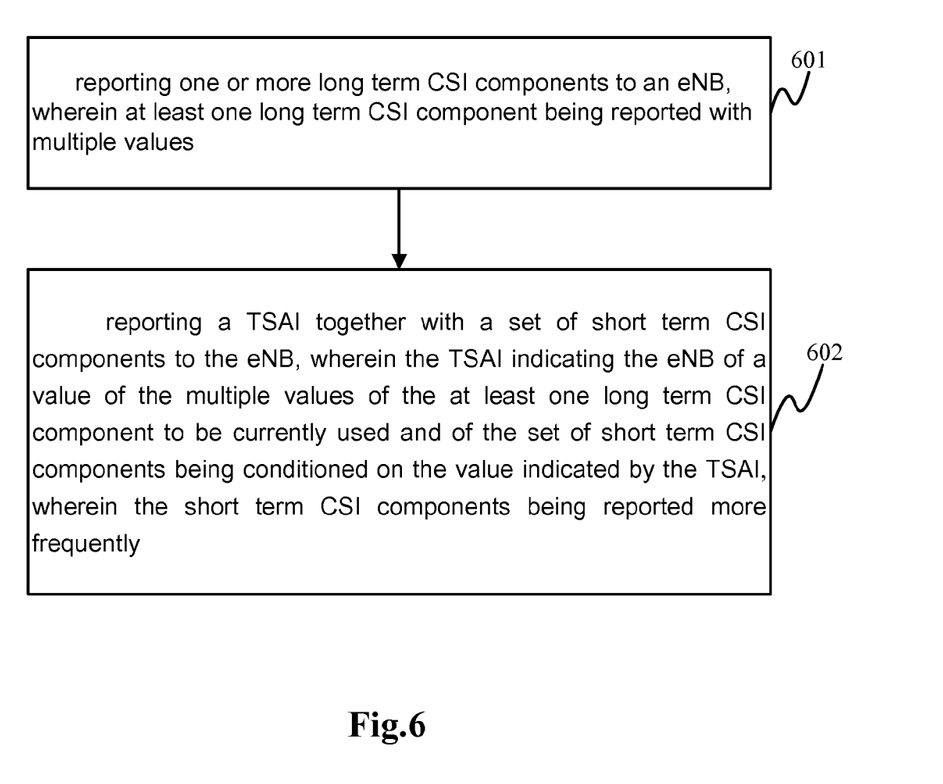
FIG. 6 shows a flowchart of the method of reporting CSI from a UE to an eNB according to the first embodiment.

FIG. 6 shows a flowchart of the method of reporting CSI, which comprises steps of: reporting one or more long term CSI components (RI in this embodiment) to an eNode B, wherein at least one long term CSI component (RI in this embodiment) is reported with multiple values ($RI_1$ and $RI_2$ in this embodiment) (601); and reporting a transmission scheme assumption indicator (TSAI) together with a set of short term CSI components (PMI/CQI in this embodiment) to the eNode B (602), wherein the TSAI indicates the eNode B of a value of the multiple values of the at least one long term CSI component to be currently used and of the set of short term CSI components being conditioned on the value indicated by the TSAI, and wherein the short term CSI components are reported more frequently.

Figure 7:
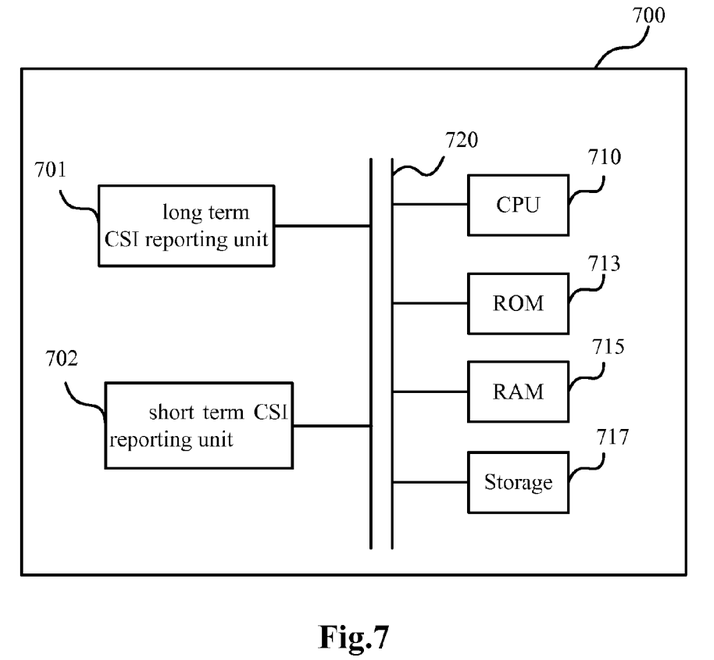
FIG. 7 is a block diagram showing UE 700 according to the first embodiment.

FIG. 7 is a block diagram showing the UE 700 according to the first embodiment of the present disclosure. The UE 700 includes a long term CSI reporting unit 701 configured to report the long term CSI components as described above in step 601 and a short term CSI reporting unit 702 configured to report the short term CSI components as described above in step 602. Specifically, the long term CSI reporting unit is configured to report one or more long term CSI components (RI in this embodiment) to an eNode B, wherein at least one long term CSI component (RI in this embodiment) is reported with multiple values ($RI_1$ and $RI_2$ in this embodiment), and the short term CSI reporting unit is configured to reporting a transmission scheme assumption indicator (TSAI) together with a set of short term CSI components (PMI/CQI in this embodiment) to the eNode B, wherein the TSAI indicates the eNode B of a value of the multiple values of the at least one long term CSI component to be currently used and of the set of short term CSI components being conditioned on the value indicated by the TSAI. The short term CSI components can be reported more frequently.

The UE 700 according to the present disclosure may further include a CPU (Central Processing Unit) 710 for executing related programs to process various data and control operations of respective units in the UE 700, a ROM (Read Only Memory) 713 for storing various programs required for performing various process and control by the CPU 710, a RAM (Random Access Memory) 715 for storing intermediate data temporarily produced in the procedure of process and control by the CPU 710, and/or a storage unit 717 for storing various programs, data and so on. The above long term CSI reporting unit 701, short term CSI reporting unit 702, CPU 710, ROM 713, RAM 715 and/or storage unit 717 etc. may be interconnected via data and/or command bus 720 and transfer signals between one another.

Respective units as described above do not limit the scope of the present disclosure. According to one embodiment of the disclosure, the functions of the above long term CSI reporting unit 701 and short term CSI reporting unit 702 may also be implemented by only one unit such as a reporting unit, and the functions of any or combination of the above long term CSI reporting unit 701 and short term CSI reporting unit 702 may also be implemented by functional software in combination with the above CPU 710, ROM 713, RAM 715 and/or storage unit 717 etc.

Figure 8:
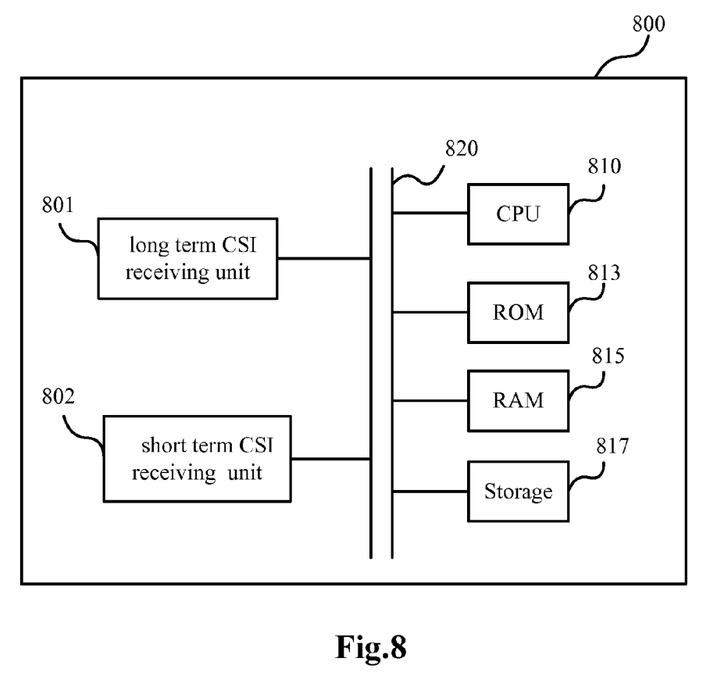
FIG. 8 is a block diagram showing eNB 800 according to the first embodiment.

Accordingly, at eNB side, the first embodiment can be implemented as a method performed by an eNB 800, which comprises the following steps: receiving subframes containing one or more long term CSI components (RI in this embodiment) from a user equipment (UE), wherein at least one long term CSI component has multiple values ($RI_1$ and $RI_2$ in this embodiment); and receiving subframes containing a set of short term CSI components (PMI/CQI in this embodiment) and a transmission scheme assumption indicator (TSAI) from the UE, wherein the TSAI indicates a value of the multiple values of the at least one long term CSI component to be currently used and the set of short term CSI components being conditioned on the value indicated by the TSAI.

FIG. 8 is a block diagram showing the eNB 800 according to the first embodiment of the present disclosure. The eNB 800 includes a long term CSI receiving unit 801 configured to receive the long term CSI components and a short term CSI receiving unit 802 configured to receive the short term CSI components as described in the last paragraph. Specifically, the long term CSI receiving unit is configured to receive subframes containing one or more long term CSI components (RI in this embodiment) from a user equipment (UE), wherein at least one long term CSI component has multiple values ($RI_1$ and $RI_2$ in this embodiment); and the short term CSI receiving unit is configured to receive subframes containing a set of short term CSI components (PMI/CQI in this embodiment) and a transmission scheme assumption indicator (TSAI) from the UE, wherein the TSAI indicates a value of the multiple values of the at least one long term CSI component to be currently used and the set of short term CSI components being conditioned on the value indicated by the TSAI.

The eNB 800 according to the present disclosure may further include a CPU (Central Processing Unit) 810 for executing related programs to process various data and control operations of respective units in the UE 800, a ROM (Read Only Memory) 813 for storing various programs required for performing various process and control by the CPU 810, a RAM (Random Access Memory) 815 for storing intermediate data temporarily produced in the procedure of process and control by the CPU 810, and/or a storage unit 817 for storing various programs, data and so on. The above long term CSI receiving unit 801, short term CSI receiving unit 802, CPU 810, ROM 813, RAM 815 and/or storage unit 817 etc. may be interconnected via data and/or command bus 820 and transfer signals between one another.

Respective units as described above do not limit the scope of the present disclosure. According to one embodiment of the disclosure, the functions of the above long term CSI receiving unit 801, and short term CSI receiving unit 802 may also be implemented by only one unit such as a receiving unit, and the functions of any or combination of above long term CSI receiving unit 801 and short term CSI receiving unit 802 may also be implemented by functional software in combination with the above CPU 810, ROM 813, RAM 815 and/or storage unit 817 etc.

Figure 9:
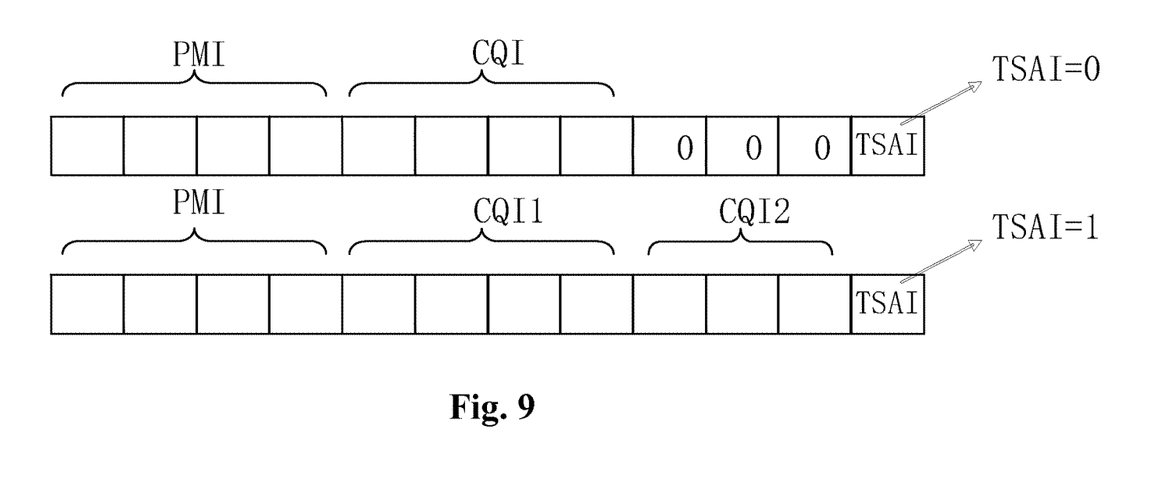
FIG. 9 schematically shows the zero padding to resolve payload size ambiguity.

In addition, in Long Term Evolution/Long Term Evolution-Advanced (LTE/LTE-A), the payload size of PMI/CQI changes with respect to the value of RI. For example, for RI=1, PMI/CQI payload size=8 bits, but for RI=2, PMI/CQI payload size=11 bits. Therefore, in the above described first embodiment, the payload size of PMI/CQI reporting is unknown to the eNB, because RI is not determined before decoding the subframes of PMI/CQI/TSAI while RI is needed to decode the PMI/CQI/TSAI. One option to resolve the payload size ambiguity is to blindly decode the PMI/CQI reporting. For example, in the case of two RIs, two payload sizes corresponding to the two RIs are respectively assumed to decode the PMI/CQI reporting, and the most likely decoding result is regarded as the value of the PMI/CQI. However, the decoding complexity and reliability is concerned to this option. Another option is to use zero padding. FIG. 9 schematically shows the zero padding to resolve payload size ambiguity. In the zero padding method, the payload size for the highest rank is used for all ranks, and zeros are padded in the remaining bits for lower ranks. As exemplarily shown in FIG. 9, TSAI=0 is assumed to indicate RI=1 and TSAI=1 is assumed to indicate RI=2, and the used payload size of PMI/CQI for both RI=1 and RI=2 is chosen to be 11 bits, which is corresponding to the real payload size of RI=2. With respect to the assignment of the 11 bits, for RI=2, 4 bits are used for PMI, 4 bits are used for CQI1, and the remaining 3 bits are used for CQI2, while for RI=1, 4 bits are used for PMI, 4 bits are used for CQI, and the remaining 3 bits are padded with zeros. Therefore, in the decoding side, the payload size of PMI/CQI/TSAI is fixed and known to the eNB, and the subframes of PMI/CQI/TSAI can thus be decoded without blindly decoding.

Figure 10:
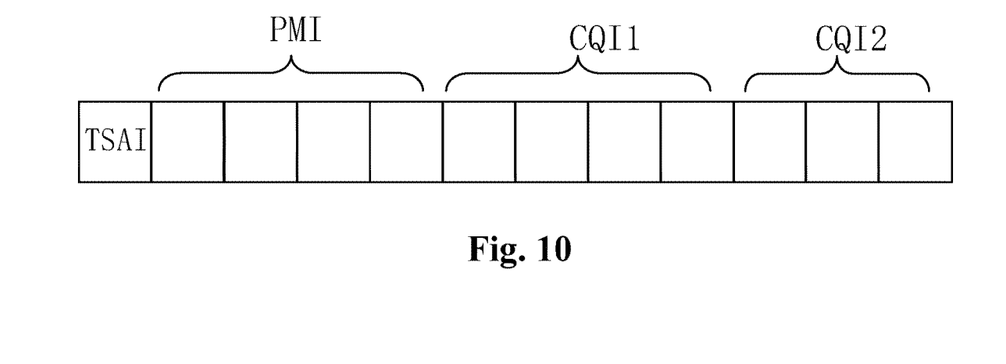
FIG. 10 schematically shows using a first bit to report TSAI for better protection when using zero padding.

In the example shown in FIG. 9, the TSAI is reported in the last bit of the PMI/CQI/TSAI combination. However, in the decoding process, TSAI should be first decoded and then used to determine RI and PMI/CQI. Therefore, TSAI is more important. In LTE/LTE-A, Reed-Muller code is used in PMI/CQI encoding, in which the first bit is protected better than other bits. Therefore, a variation of PMI/CQI/TSAI reporting is to use the first bit to report TSAI. FIG. 10 schematically shows using the first bit to report TSAI for better protection when using zero padding. It is noted that although one bit is used for TSAI in the above examples, TSAI can also use any number of bits as necessary. When more than one bits are used for TSAI, those bits can be deployed as the first bits or last bits in the PMI/CQI/TSAI combination.

Figures 11, 12, 13:
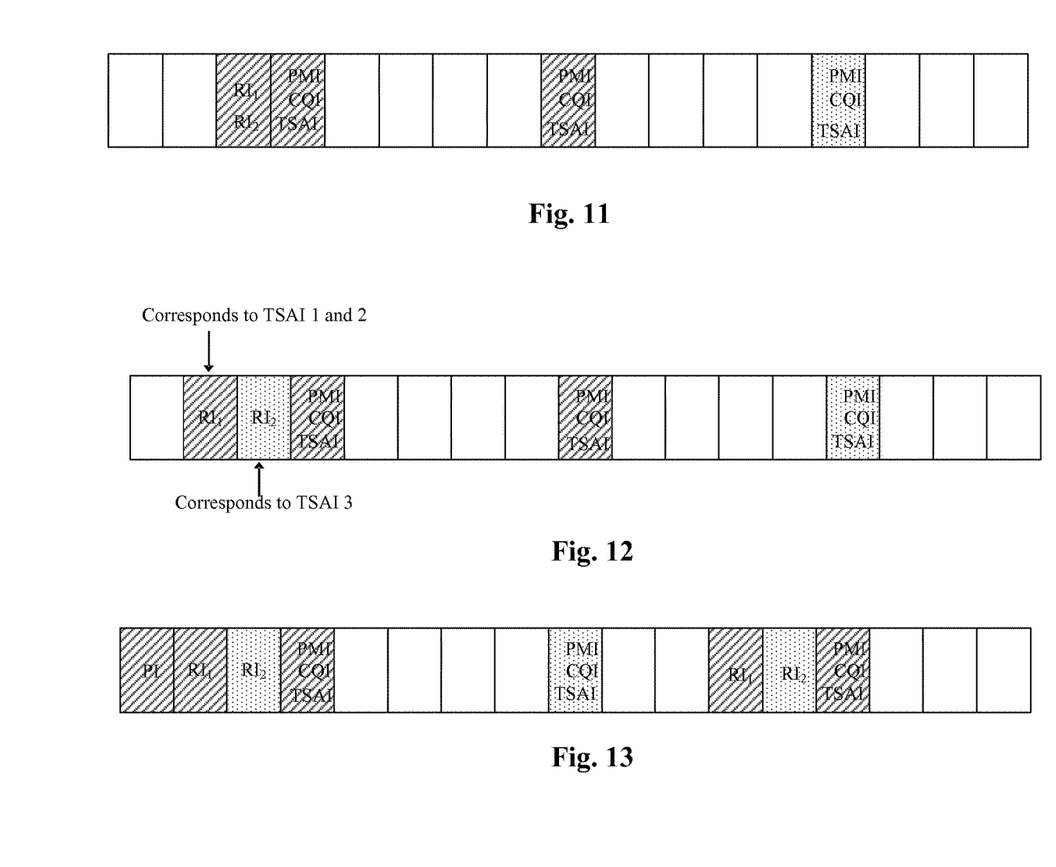
FIG. 11 schematically shows multiple RIs being reported in one subframe.
FIG. 12 schematically shows TSAI grouping based on RI.
FIG. 13 schematically shows the reporting of PI in addition to RI.

In the above examples, the multiple values of RI are reported in separate subframes, however, these RIs can also be reported in one subframe. FIG. 11 schematically shows multiple RIs being reported in one subframe. In FIG. 11, two values of RI ($RI_1$, $RI_2$) are jointly encoded and reported within one subframe. It is obvious to those skilled in the art that the number of values of RI is not limited to two, and it can be any as necessary. As a result, one or more subframes for RI reporting can be reduced, and the frame format can be kept similar to one single CSI reporting.

In addition, in case that the number of possible transmission schemes is more than the number of possible RIs, it is possible to group TSAIs based on the value of RIs. In other words, when the number of possible values of TSAI is larger than the number of the values of RI to be reported, more than one values of TSAI may correspond to one value of RI. FIG. 12 schematically shows TSAI grouping based on RI. As exemplarily shown in FIG. 12, there are three possible values for TSAI (TSAI1, TSAI2, and TSAI3), while only two values for RI ($RI_1$ and $RI_2$) are reported. In this case, for example, it can be assumed that the two values of TSAI (TSAI1 and TSAI2) correspond to $RI_1$, and the other value of TSAI (TSAI3) corresponds to $RI_2$. The grouping can be reported to the eNB. Then it is possible to reduce the number of necessary RI reporting. It is noted that this solution also applies to any other configuration of CSI components.

In a variation of the present embodiment, in addition to RI, point indicator (PI) can also be reported as another long term CSI component. The PI indicates the eNB which is assumed to transmit PDSCH. For example, in FIG. 1A and FIG. 1B, if PI=1, the reported CSI assumes that the eNB 102 transmits PDSCH to the UE 103. If PI=0, the reported CSI assumes that the eNB 101 transmits PDSCH to the UE 103. FIG. 13 schematically shows the reporting of PI in addition to RI. As exemplarily shown FIG. 13, one PI is reported before the reporting of several RIs, i.e, the same PI is enforced for different RI and TSAI, which implies that those RIs and TSAIs corresponds PDSCH from the same eNB, but the assumption on interference may be different for different RIs and TSAIs (e.g., if the neighbor eNB is muted or not). Therefore, the only difference between the scheme of FIG. 5 and the scheme of FIG. 13 is that one additional PI is reported for several periods of RI reporting. In this case, different RIs are associated with one PI. However, It is also possible to use TSAI (with additional bits) to select PI. In other words, multiple values of PI can be reported. In addition, the PI may or may not be reported less frequently than RI.

(Second Embodiment)

Figure 14:
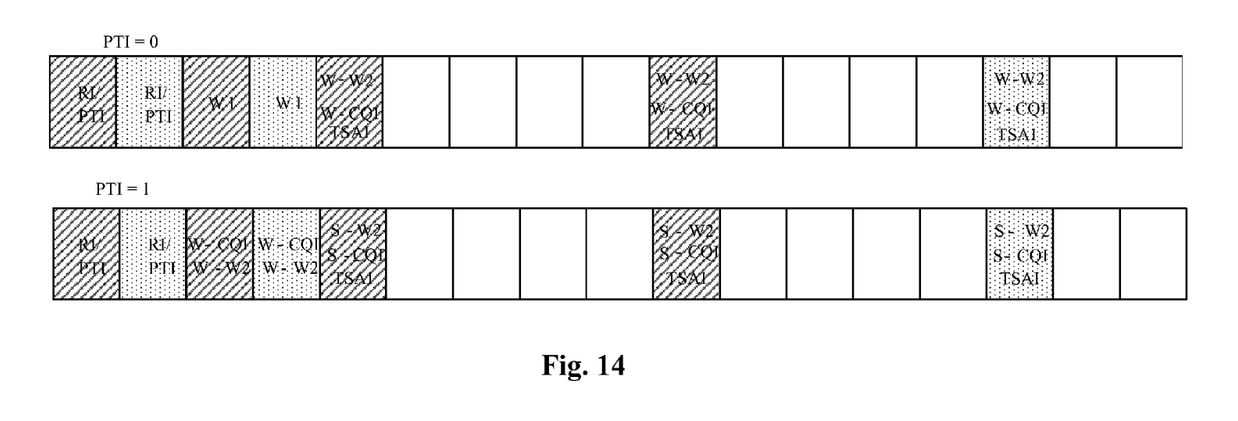
FIG. 14 schematically shows the long term CSI reporting with multiple RI/PTI and W1 according to the second embodiment.

In LTE/LTE-A, for 8Tx PUCCH (Physical Uplink Control Channel) mode 2-1, long term CSI can include not only RI, but also precoding type indicator (PTI) and first PMI (W1). Therefore, it is also possible to report multiple PTI and W1 in addition to RI, and TSAI can be used to indicate which RI/PTI and which W1 is associated with current PMI/CQI reporting, i.e. to indicate a value of RI/PTI and a value of W1 to be currently used. FIG. 14 schematically shows the long term CSI reporting with multiple RI/PTI and W1 according to the second embodiment. The following description is only given to the difference between the first embodiment and the second embodiment, and the same or similar configurations or method steps will be omitted. In particular, as shown in FIG. 14, when PTI=0, RI, PTI and W1 are reported as long term CSI components, the RI and PTI are encoded together in one subframe, and multiple (two in this example as indicated respectively by hatched and dotted backgrounds) values of RI/PTI combination and W1 are reported. Accordingly, the short term CSI components include wideband second PMI (W-W2) and wideband CQI (W-CQI). On the other hand, when PTI=1, RI, PTI, W-CQI, and W-W2 are reported as long term CSI components, the RI and PTI are encoded together in one subframe, W-CQI and W-W2 are also encoded together in one subframe, and multiple (two in this example as indicated respectively by hatched and dotted backgrounds) values of RI/PTI combination and W-CQI/W-W2 combination are reported. Accordingly, the short term CSI components include subband second PMI (S-W2) and subband CQI (S-CQI). In this example, Zero padding can also be applied to resolve payload size ambiguity.

Figure 15:
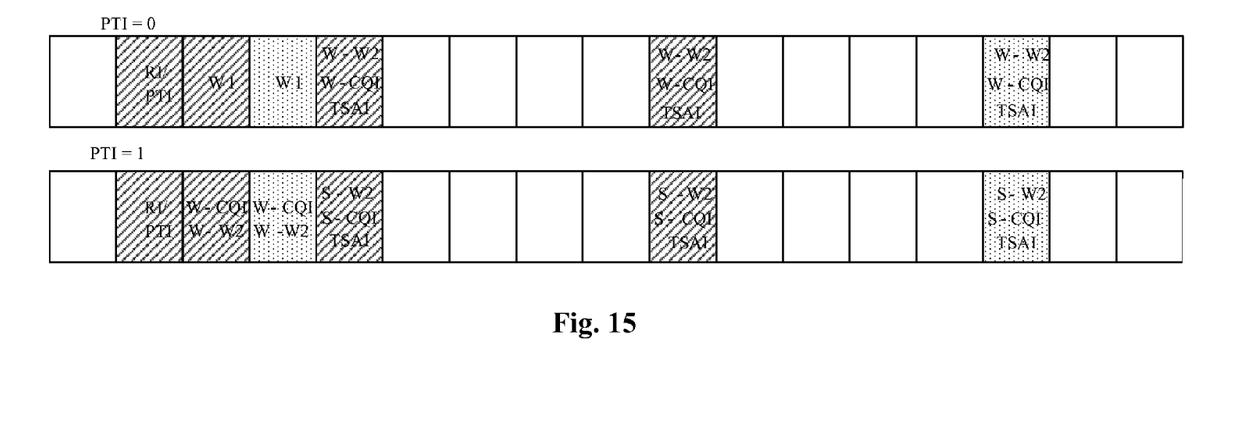
FIG. 15 schematically shows the long term CSI reporting with single RI/PTI and multiple W1 according to a variation of the second embodiment.

As a variation to the second embodiment, common RI/PTI can be enforced across multiple CSI reporting. FIG. 15 schematically shows the long term CSI reporting with a single RI/PTI and multiple W1 according to a variation of the second embodiment. FIG. 15 differs from FIG. 14 in that the RI/PTI is reported only with one value in one period of their reporting. This variation does not cause any payload size ambiguity; therefore, decoding complexity is not concerned, and zero padding is not necessary to be performed.

(Third Embodiment)

Figure 16:
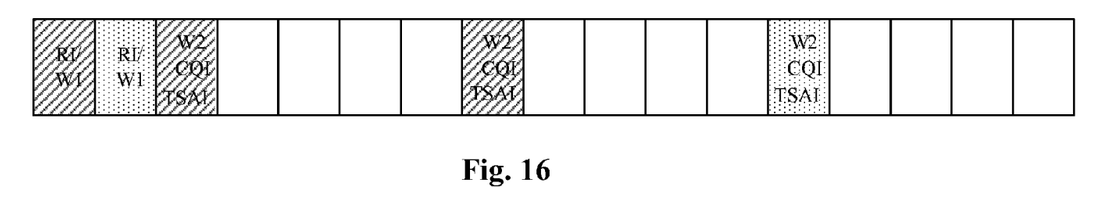
FIG. 16 schematically shows multiple reporting of joint RI/W1 according to the third embodiment.

In 8Tx PUCCH mode 1-1 submode 1, RI and W1 are jointly encoded and reported within the same subframes. Therefore, it is possible to report multiple RI/W1. FIG. 16 schematically shows the multiple reporting of joint RI/W1 according to the third embodiment. The following description is only given to the difference between the first embodiment and the third embodiment, and the same or similar configurations or method steps will be omitted. The details and impact of the third embodiment are similar to the first embodiment except that multiple W1 is also reported jointly with RI, and W2 is reported as one of the short term CSI components instead of PMI.

Figure 17:
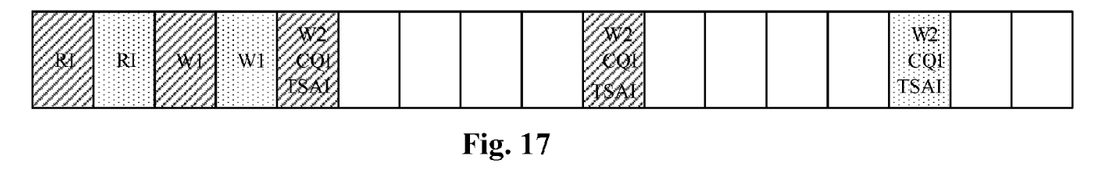
FIG. 17 schematically shows multiple reporting of separate RI/W1 according to a variation of the third embodiment.

As a variation, the RI can also be reported separately with W1, i.e. in separate subframes. FIG. 17 schematically shows multiple reporting of separate RI/W1 according to a variation of the third embodiment. In FIG. 17, RI and W1 are reported in separate subframes respectively with multiple values (two in this example as indicated respectively by hatched and dotted backgrounds), and TSAI can be used to indicate which RI and which W1 is associated with the current reported set of short term CSI components (W2/CQI in this example), i.e. to indicate a value of RI and a value of W1 to be currently used. In this case as shown in FIGS. 16 and 17, zero padding can also be applied to resolve the payload size ambiguity.

Figure 18:
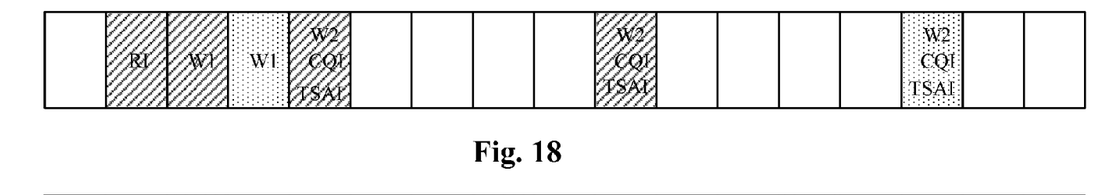
FIG. 18 schematically shows the reporting of separate RI/W1 with multiple W1 and single RI according to another variation of the third embodiment.

As another variation, FIG. 18 schematically shows the reporting of separate RI/W1 with multiple W1 and single RI. In this variation, RI can be reported with only one value in one period of RI's reporting, while W1 can be reported with multiple values. That is to say, the same RI is enforced for different sets of W2/CQI, so that there is no payload size ambiguity, decoding complexity is not concerned, and zero padding is not necessary to be performed.

(Fourth Embodiment)

Figure 19:
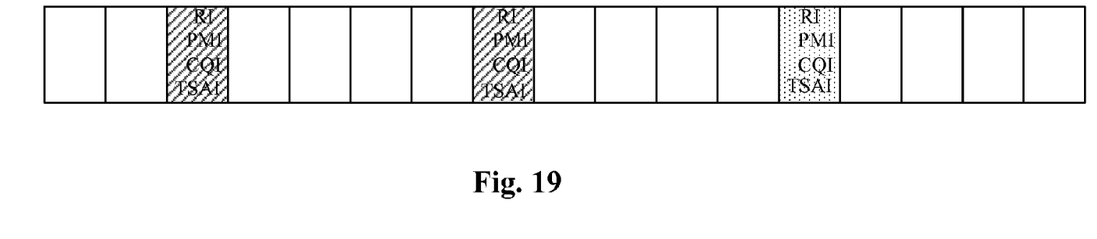
FIG. 19 schematically shows the reporting of RI jointly encoded with PMI, CQI and TSAI according to the fourth embodiment.

Considering RI changes with respect to TSAI, another solution to report CSI is to jointly encode RI with PMI, CQI and TSAI in one subframe. FIG. 19 schematically shows the reporting of RI jointly encoded with PMI, CQI and TSAI according to the fourth embodiment. In this embodiment, RI is no longer considered as a long term CSI component as in the above three embodiments, but as a short term CSI component similarly with PMI, CQI and TSAI. Since RI is reported with PMI, CQI and TSAI in one subframe and the bit number of PMI/CQI depends on the value of RI, the bandwidth of the CSI reporting is unknown before decoding at eNB. Accordingly, at eNB side, blind decoding can be used to get the values of RI, PMI, CQI and TSAI.

Therefore, the wireless communication method of reporting CSI according to the fourth embodiment comprises the following steps performed by the UE: reporting a set of CSI components including a rank indicator (RI), a precoding matrix indicator (PMI), and a channel quality indicator (CQI), together with a transmission scheme assumption indicator (TSAI) to an eNode B, wherein the TSAI indicates the eNode B of the PMI and the CQI being conditioned on the RI and the TSAI, and the set of CSI components and the TSAI are jointly encoded and reported within one subframe.

The configuration of the UE according to the fourth embodiment can be similar to UE 700 except that the UE according to the fourth embodiment does not distinguish between long term CSI components and short term CSI components, that is, it can include only a CSI reporting unit to perform the above described reporting step instead of including the long term CSI reporting unit 701 and short term CSI reporting unit 702. Specifically, the CSI reporting unit of the UE according to the fourth embodiment is configured to report a set of CSI components including a rank indicator (RI), a precoding matrix indicator (PMI), and a channel quality indicator (CQI), together with a transmission scheme assumption indicator (TSAI) to an eNode B, wherein the TSAI indicates the eNode B of the PMI and the CQI being conditioned on the RI and the TSAI, and the set of CSI components and the TSAI are jointly encoded and reported within one subframe.

Accordingly, at the eNB side, according to the fourth embodiment, there is provided a wireless communication method of receiving CSI, the method comprises steps of: receiving subframes containing a set of CSI components and a transmission scheme assumption indicator (TSAI) from a user equipment (UE), wherein the set of CSI components include a rank indicator (RI), a precoding matrix indicator (PMI), and a channel quality indicator (CQI), the TSAI indicates the PMI and the CQI being conditioned on the RI and the TSAI, and the set of CSI components and the TSAI are jointly encoded and reported within one subframe.

And the configuration of the eNB according to the fourth embodiment can be similar to eNB 800 except that a receiving unit is used to perform the above described receiving step instead of the long term CSI receiving unit 801 and the short term CSI receiving unit 802. Specifically, the receiving unit of the eNB according to the fourth embodiment is configured to receive subframes containing a set of CSI components and a transmission scheme assumption indicator (TSAI) from a user equipment (UE), wherein the set of CSI components include a rank indicator (RI), a precoding matrix indicator (PMI), and a channel quality indicator (CQI), the TSAI indicates the PMI and the CQI being conditioned on the RI and the TSAI, and the set of CSI components and the TSAI are jointly encoded and reported within one subframe.

With the configuration in FIG. 19, for each TSAI, the optimal value of RI can be reported simultaneously.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of those skilled in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skills in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A wireless communication method performed by a user equipment (UE) of reporting channel state information (CSI), comprising:
   receiving downlink signals from one or more transmission points, wherein one of the downlink signals is intended for the UE;
   reporting a set of long term CSI components in a first report having a first report period, the set of long term CSI components including at least two different types of long term CSI components that include a rank indicator (RI) and a first precoding matrix indicator (W1), the at least two different types of long term CSI components in the set being one of multiple sets of long term CSI components, wherein the downlink signal intended for the UE is determined from the set of long term CSI components; and
   reporting a set of short term CSI components in a second report having a second report period shorter than the first report period, the set of short term CSI components including at least two different types of short term CSI components selected to be reported in association with the currently reported set of the long term CSI components;
   and
   reporting a transmission scheme assumption indicator (TSAI) together with the set of short term CSI components, wherein the TSAI indicates a value of at least one long term CSI component in the currently reported set of long term CSI components and indicates the set of short term CSI components being conditioned on the value indicated by the TSAI,
   wherein a value of the RI and a value of the W1 in the currently reported set, at least one of which being indicated by the TSAI, are jointly encoded and reported in one subframe.

2. The wireless communication method according to claim 1, wherein the at least two different types of short term CSI components include a wideband second PMI (W-W2) and a wideband CQI (W-CQI).

3. A user equipment (UE) configured to report channel state information (CSI), comprising:
   a receiver which, in operation, receives downlink signals from one or more transmission points, wherein one of the downlink signals is intended for the UE;
   a processor coupled to the receiver and which, in operation, prepares reporting of a set of long term CSI components in a first report having a first report period, the set of long term CSI components including at least two different types of long term CSI components that include a rank indicator (RI) and a first precoding matrix indicator (W1), and the at least two different types of long term CSI components in the set being one of multiple sets of long term CSI components, wherein the downlink signal intended for the UE is determined from the set of long term CSI components, and prepares reporting of a set of short term CSI components in a second report having a second report period shorter than the first report period, the set of short term CSI components including at least two different types of short term CSI components selected to be reported in association with the currently reported set of the long term CSI components, and prepares reporting of a transmission scheme assumption indicator (TSAI) which indicates a value of at least one long term CSI component in the currently reported set of long term CSI components and indicates the set of short term CSI components being conditioned on the value indicated by the TSAI; and
   a transmitter coupled to the circuitry and which, in operation, reports the TSAI together with the selected set of short term CSI components in the second report and the current set of long term CSI components in the first report,
   wherein a value of the RI and a value of the W1 in the currently reported set, at least one of which being indicated by the TSAI, are reported in separate subframes, respectively.

4. The user equipment (UE) according to claim 3, wherein the at least two different types of short term CSI components include a wideband second PMI (W-W2) and a wideband CQI (W-CQI).

5. An integrated circuit that controls operation of a user equipment (UE), the integrated circuit comprising:
   at least one input, wherein the at least one input, in operation, receives downlink signals from one or more transmission points, wherein one of the downlink signals is intended for the UE;
   circuitry coupled to the at least one input and which, in operation, prepares reporting of a set of long term CSI components in a first report having a first report period, the set of long term CSI components including at least two different types of long term CSI components that include a rank indicator (RI) and a first precoding matrix indicator (W1), and the at least two different types of long term CSI components in the set being one of multiple sets of long term CSI components, wherein the downlink signal intended for the UE is determined from the set of long term CSI components, and prepares reporting of a set of short term CSI components in a second report having a second report period shorter than the first report period, the set of short term CSI components including at least two different types of short term CSI components selected to be reported in association with the currently reported set of the long term CSI components, and prepares reporting of a transmission scheme assumption indicator (TSAI) which indicates a value of at least one long term CSI component in the currently reported set of long term CSI components and indicates the set of short term CSI components being conditioned on the value indicated by the TSAI; and
   at least one output coupled to the circuitry, wherein the at least one output, in operation, outputs the TSAI together with the selected set of short term CSI components in the second report and outputs the current set of long term CSI components in the first report, wherein a value of the RI and a value of the W1 in the currently reported set, at least one of which being indicated by the TSAI, are jointly encoded and reported in one subframe, or are separately encoded and reported in separate subframes, respectively.

6. The integrated circuit according to claim 5, wherein the at least two different types of short term CSI components include a wideband second PMI (W-W2) and a wideband CQI (W-CQI).

7. The wireless communication method according to claim 1, wherein the at least two different types of long term CSI components include a precoding type indicator (PTI).

8. The user equipment (UE) according to claim 3, wherein the at least two different types of long term CSI components include a precoding type indicator (PTI).

9. The integrated circuit according to claim 5, wherein the at least two different types of long term CSI components include a precoding type indicator (PTI).

10. The wireless communication method according to claim 1, wherein:
the downlink signals are received from multiple transmission points in multiple serving cells, respectively; and
the reporting of the set of long term CSI components and the reporting of the TSAI together with the set of short term CSI components is performed for one of the multiple serving cells.

11. The user equipment (UE) according to claim 3, wherein:
the receiver, in operation, receives the downlink signals from multiple transmission points in multiple serving cells, respectively, and
the processor, in operation, prepares the reporting of the set of long term CSI components and the reporting of the TSAI together with the set of short term CSI components for one of the multiple serving cells.

12. The integrated circuit according to claim 5, wherein:
the at least one input, in operation, receives the downlink signals from multiple transmission points in multiple serving cells, respectively, and
the circuitry, in operation, prepares the reporting of the set of long term CSI components and the reporting of the TSAI together with the set of short term CSI components for one of the multiple serving cells.

13. The wireless communication method according to claim 1, wherein the at least two different types of long term CSI components include a point indicator (PI).

14. The user equipment (UE) according to claim 3, wherein the at least two different types of long term CSI components include a point indicator (PI).

15. The integrated circuit according to claim 5, wherein the at least two different types of long term CSI components include a point indicator (PI).

16. The wireless communication method according to claim 1, wherein the set of short term CSI components and the TSAI are jointly encoded and reported in one subframe.

17. The UE according to claim 3, wherein the set of short term CSI components and the TSAI are jointly encoded and reported in one subframe.

18. The integrated circuit according to claim 5, wherein the set of short term CSI components and the TSAI are jointly encoded and reported in one subframe.

19. The UE according to claim 3, wherein a single value of the RI and at least two values of the WI in the currently reported set, at least one of which being indicated by the TSAI, are reported in at least three separate subframes, respectively.

20. The integrated circuit according to claim 5, wherein the currently reported single value of the RI and at least two values of the WI in the currently reported set, at least one of which being indicated by the TSAI, are reported in at least three separate subframes, respectively.

* * * * *